United States Patent [19]

Botterill

[11] Patent Number: 5,080,640
[45] Date of Patent: Jan. 14, 1992

[54] DIFFERENTIAL UNIT

[75] Inventor: John R. Botterill, Saarbrücken, Fed. Rep. of Germany

[73] Assignee: GKN Automotive AG, Fed. Rep. of Germany

[21] Appl. No.: 762,729

[22] Filed: Sep. 17, 1991

Related U.S. Application Data

[63] Continuation of Ser. No. 534,719, Jun. 7, 1990, abandoned.

[30] Foreign Application Priority Data

Jun. 7, 1989 [DE] Fed. Rep. of Germany ....... 3918590
Jun. 26, 1989 [DE] Fed. Rep. of Germany ....... 3920861

[51] Int. Cl.⁵ ............................................. F16H 1/44
[52] U.S. Cl. ..................................... 475/231; 475/150
[58] Field of Search ............... 475/150, 221, 224, 231, 475/239, 240

[56] References Cited

U.S. PATENT DOCUMENTS

| | | | |
|---|---|---|---|
| 876,501 | 1/1908 | Steinhauer | 475/221 |
| 1,361,731 | 12/1920 | Jayne | 475/221 |
| 3,546,968 | 12/1970 | Altmann | 475/240 |
| 4,677,873 | 7/1987 | Eastman et al. | 475/221 X |
| 4,805,486 | 2/1989 | Hagiwara et al. | 475/239 X |
| 4,934,213 | 6/1990 | Niizawa | 475/239 X |

Primary Examiner—Leslie A. Braun
Assistant Examiner—William O. Trousdell
Attorney, Agent, or Firm—Toren, McGeady & Associates

[57] ABSTRACT

A differential unit comprises a differential carrier (12) supported in a housing (11) for rotation; output elements (16, 17) differentially rotatable relative to the carrier and connected to respective output shafts; differential gears connecting the output elements; and a friction assembly comprising respective plates (22, 24) rotationally fast with elements of the differential, the friction assembly being axially loadable to restrict the differential rotation of the output elements. An actuating mechanism for loading the friction assembly comprises abutment and actuating rings angularly and axially movable relative to one another, with cam surfaces provided by circumferentially extending variable depth grooves in the rings with balls therebetween engaging the grooves. In order to avoid unintentional restriction of the differential action, the grooves and balls are arranged so that no frictional self-inhibition of relative movement between the abutment and actuating rings can occur.

14 Claims, 13 Drawing Sheets

DIFFERENTIAL UNIT

This is a continuation application of Ser. No. 07/534,719, filed June 7, 1990 now abandoned.

BACKGROUND TO THE INVENTION

1. Field of the Invention

This invention relates to a differential unit, particularly suitable for use in motor vehicles as described hereafter, which incorporates a controllable friction assembly for restricting the differential action of the unit.

More particularly, the invention relates to a differential unit comprising:
- a housing;
- a drivable differential carrier supported in the housing for rotation about an axis;
- two output elements rotatable about said axis relative to the differential carrier and connected to respective output shafts;
- differential gears rotatably supported by the differential carrier and having driving connection with the output elements to permit differential rotation thereof;
- a friction assembly axially supported by one rotatable element of the differential, and axially loadable by an actuating means to cause a frictional restriction of said differential rotation of the output elements;
- the actuating means comprising an abutment ring axially fixed relative to the housing; an actuating ring movable axially relative thereto, one of the abutment and actuating rings being movable angularly relative to the other; and means for producing an axial movement of the actuating ring upon said relative angular movement between the rings, said means comprising cooperating surfaces provided on said abutment ring and actuating ring, and rolling members disposed therebetween.

Such a differential unit will hereafter be referred to as a differential unit of the kind specified.

The friction assembly preferably comprises a number of plates rotationally fast with said one rotatable element of the differential, interleaved with a number of plates rotationally fast with another element of the differential rotatable about said axis.

2. Description of the Prior Art

In JP 64-3148 there is disclosed a differential unit which is generally of the kind specified except that the friction assembly is arranged to be axially loaded by way of a hydraulic cylinder incorporated into the differential unit. Such an actuating means for the friction assembly is effective in terms of its function and behaviour, but relatively expensive, even if the differential unit is to be used in a motor vehicle which already has an hydraulic system for power steering or suspension purposes for example.

DE-OS 3707115 discloses a differential unit with a controllable frictional restriction of its differential action, wherein electro-magnetic means is used for loading the friction assembly. However, electro-magnetic actuation has the disadvantage that an acceptable force to load the friction assembly can only be produced within a relatively narrow wear range of the plates in the friction assembly, because otherwise the coil and armature upon which it acts are not in the correct relative position for a satisfactory force to be exerted.

Another differential unit wherein a friction assembly is actuated electro-magnetically is disclosed in DE-OS 3733771. In this differential, the friction assembly may not be able to exert sufficient force adequately to resist the differential and the unit is very bulky which renders it difficult to fit in a vehicle with a transversely mounted engine-transmission unit. Further, there can be fluctuations in the torque of the friction assembly.

A further design of differential unit is proposed in US 4,805,486, wherein the actuating mechanism for the friction assembly comprises coaxially disposed plates having circumferentially extending inclined grooves provided on opposed faces thereof, with rolling members (balls) disposed in the grooves. One of the plates is firmly connected to the housing of the differential unit, whilst the other is movable angularly by an electric motor through a toothed reduction gear arrangement.

The arrangement is such that when the electric motor is not energised, the plates remain apart from one another. This is undesirable in that if there is any failure the differential may remain in the condition wherein the differential action between its output elements is restricted. Further, the frictional forces which arise between the toothed expansion plate and the pinion engaged thereby cause disadvantageous hysteresis effects during adjustment of the force applied to the friction assembly.

SUMMARY OF THE INVENTION

It is broadly the object of the present invention to eliminate the above referred to disadvantages of the previously proposed differential unit, whilst providing an operationally safe, easily controllable, and compact design of unit.

According to the invention, we provide a differential unit of the kind specified wherein the cooperating surfaces provided on the abutment ring and actuating ring, and the rolling members disposed therebetween, are designed in such a way that no self-inhibition of relative movement occurs therebetween.

Such a condition is achieved by suitable geometry of the surfaces in respect of the angles at which they are inclined (ramp angles) and their circumferential disposition.

The angularly movable one of the abutment and actuating rings may be arranged to be angularly movable by providing a peripheral portion thereof with teeth engagable with a driving pinion. The driving pinion is preferably driven by an electric motor by way of a reduction gearing arrangement. In the case where the actuating ring is movable both axially and angularly, possible undesirable frictional forces arising between the pinion and toothed peripheral portion of the ring may be reduced by utilizing helical teeth, designed in such a way that when the actuating ring is being moved in the direction to cause an increase in the load applied to the friction assembly, the sense of the helical teeth is such that an axial force in the same direction is applied to the ring.

A further advantage in respect of decreasing friction in the teeth may be obtained by causing the motor to operate with a pulsating output torque, conveniently achieved by applying a pulsating current or voltage to an electric motor, with a frequency not less than 5 Hz.

There may be provided spring means operative between the abutment ring and actuating ring, to return them to their relative starting position wherein the friction assembly is not loaded. Such springs may be tension springs disposed between the rings, or a torsion spring could be associated with the electric motor which moves the one ring angularly. Such springs are of assistance if, unexpectedly, the rings should become jammed relative to one another.

As an alternative or in addition to such return spring means, a switchable (controllable) freewheeling unit may be provided in the reduction gearing connecting the electric motor to the angularly movable ring, the freewheeling unit being operable so that, when the motor is actuated to load the friction assembly, it locks the motor or gearing against return movement of the actuating ring. When actuation of the motor is discontinued to permit return movement of the ring, the freewheeling unit disconnects the reduction gearing from the electric motor.

With such provision, it may be sufficient to design the motor so as to rotate in one direction only, i.e. not to provide for a powered return movement.

The abutment ring may be fixed relative to the housing of the differential unit, with the actuating ring being both angularly and axially displaceable relative thereto. Alternatively, the actuating ring may be only axially displaceable, while the abutment ring is axially fixed and angularly movable by the electric motor. In either case, the length of the assembly is relatively small, rendering it suitable to be installed in front wheel drive vehicles with transverse engine-transmission installations.

The differential unit may be of the planetary type wherein all the gears are supported for rotation about axes parallel to one another. Such a type of differential has a shorter axial length as compared with a bevel gear differential, of similar torque capacity. The combination of a planetary differential with the above described expansion mechanism provides a very compact assembly.

The friction assembly may be operative directly between the output elements of the differential gearing, in which case the torque exerted by the friction assembly is lower than that required if it were operative between an output element and the differential carrier.

The cooperating surfaces on the abutment ring and actuating ring may be arranged such that, from a starting position of the actuating ring wherein no load is applied to the friction assembly, the rate of change of axial position thereof, as a function of angular movement of the actuating ring or abutment ring, is initially high and then becomes lower.

In a differential unit thus provided the initial relatively large axial component of movement of the actuating ring produced by an increment of angular movement of it or the abutment ring, from the starting position wherein the friction plates are completely disengaged and unloaded, results in a rapid take up of any clearances between the friction plates, while no significant reaction forces therebetween need to be overcome. The response speed of the friction assembly of the differential unit is thus improved. Thereafter, as the axial movement of the actuating ring produced by an increment of angular movement decreases, preferably progressively, the frictional force can be more finely controlled. Hence the restriction of the differential action of the differential unit can be more finely controlled from a small degree of restriction possibly up to complete locking of the output elements of the unit relative to one another.

The actuating ring and abutment ring may be provided with facing pairs of circumferentially extending spaced grooves, with the grooves of each pair increasing in depth in opposite circumferential directions, whilst a plurality of rolling members, preferably balls, are provided one in each facing pair of grooves. This provides advantageous frictional conditions between the rings. The change in pitch may be expressed mathematically in the following formula:

$$\frac{dy}{dx} = \frac{c_1 a}{c_1 x} + c_2 \text{ and } \frac{dy}{dx} = b - ax \text{ respectively,}$$

with y being the axially effective change in height of each surface, x respective distance in the circumferential direction along each surface, a,b,c, $c_1$, $c_2$ being constants. There is obtained a profile in accordance with the expressions $$y = a \ln(c_1 x + c_2) + b, \text{ and } y = bx - \frac{ax^2}{2} + c \text{ respectively}$$

There remain to be determined the initial and final inclination angles of the surfaces. With opposed grooves in the faces of the abutment ring and actuating ring with balls engaging respective pairs of facing grooves, an initial angle of inclination in the range 6° to 9° and a final angle of inclination in the range 1° to 1.5° is suitable. The final or runout angle may be constant as far as the end of the grooves. In this way it is ensured that for all conditions of wear of the friction plates the friction assembly operates with the same characteristics.

Preferably there is provided, between the actuating ring and abutment ring, an annular or disc-like cage which has apertures extending through it, receiving the balls and thus ensuring that all the balls move synchronously with one another.

The grooves engaged by the balls may be disposed at a constant radius relative to the axis of the differential unit, with the change in relationship between angular movement of the actuating or abutment ring and axial movement of the actuating ring, according to the invention, achieved simply by appropriate configuration of the inclination of the grooves. In another embodiment, the inclination of the grooves may be constant along their length, whilst the grooves are disposed in such a way that they extend radially as well as circumferentially, to achieve the changing relationship between angular and axial displacement of the rings. It is of course possible to provide a combination of these two configurations of groove. Preferably there are provided at least three facing pairs of grooves and rolling members engaging therein. The deepest parts of the grooves serve as return stops for limiting the relative angular movement between the rings in one direction.

An advantage of providing the changing relationship between angular and axial displacement of the rings is that, during the return movement of the actuating ring to unload the friction assembly, the balls roll along the grooves whose effective gradient increases, thereby facilitating such return movement when otherwise the actuating ring may move only hesitatingly due to the reduced return spring effect.

BRIEF DESCRIPTION OF THE DRAWINGS

The invention will now be described by way of example with reference to the accompanying drawings, of which:

FIG. 9a is a section along the line A—A of FIG. 9;

DESCRIPTION OF PREFERRED EMBODIMENT

Figure 1:
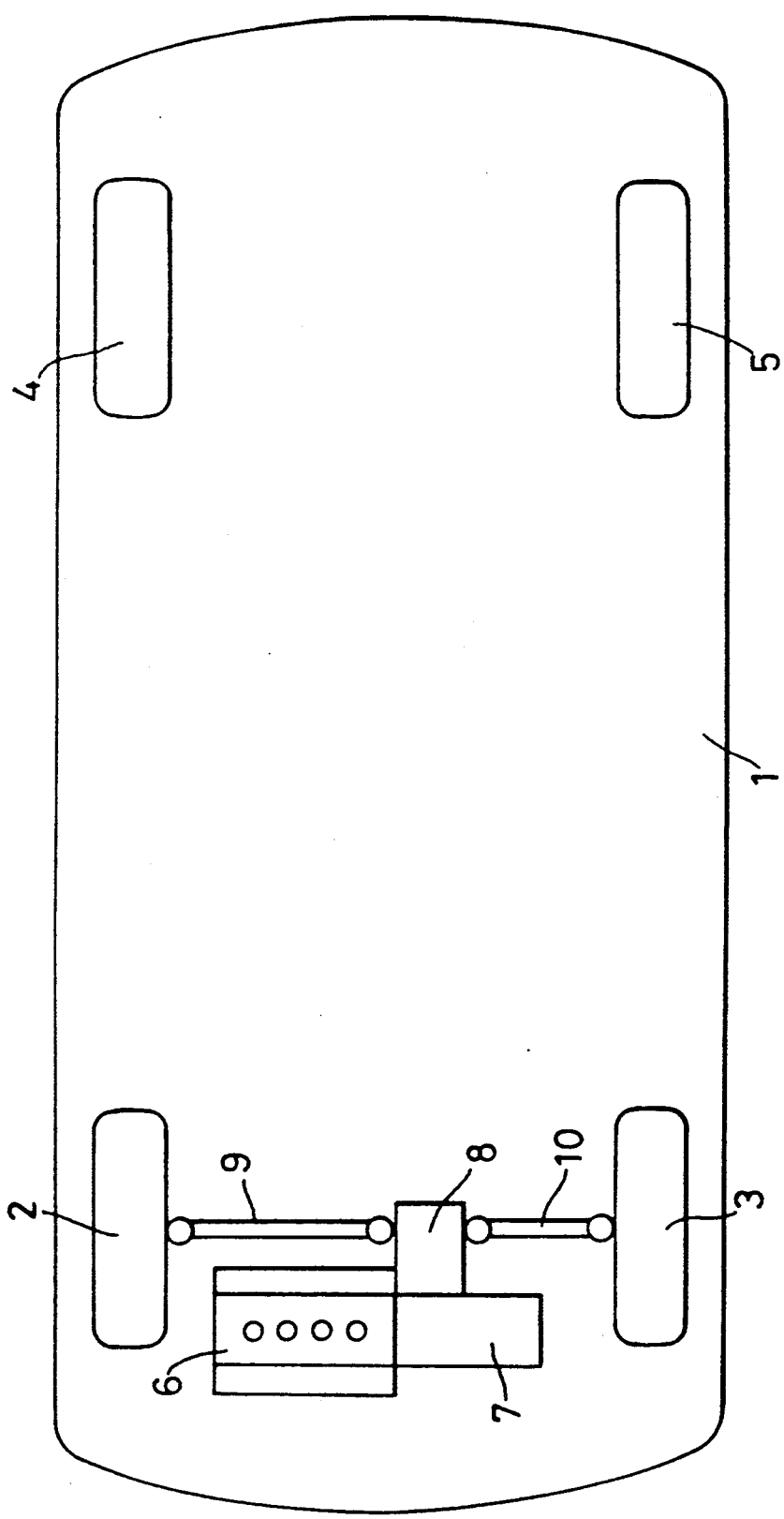
FIG. 1 shows diagrammatically the driveline layout of a front wheel drive vehicle.

Referring firstly to FIG. 1 of the drawings, this shows in diagrammatic outline plan view a vehicle 1 having a pair of front wheels 2, 3 and a pair of rear wheels 4, 5. The vehicle is a front wheel drive vehicle, having an engine 6, gearbox 7, and differential unit 8 from which driveshafts 9, 10 extend to the front wheels.

Figure 2:
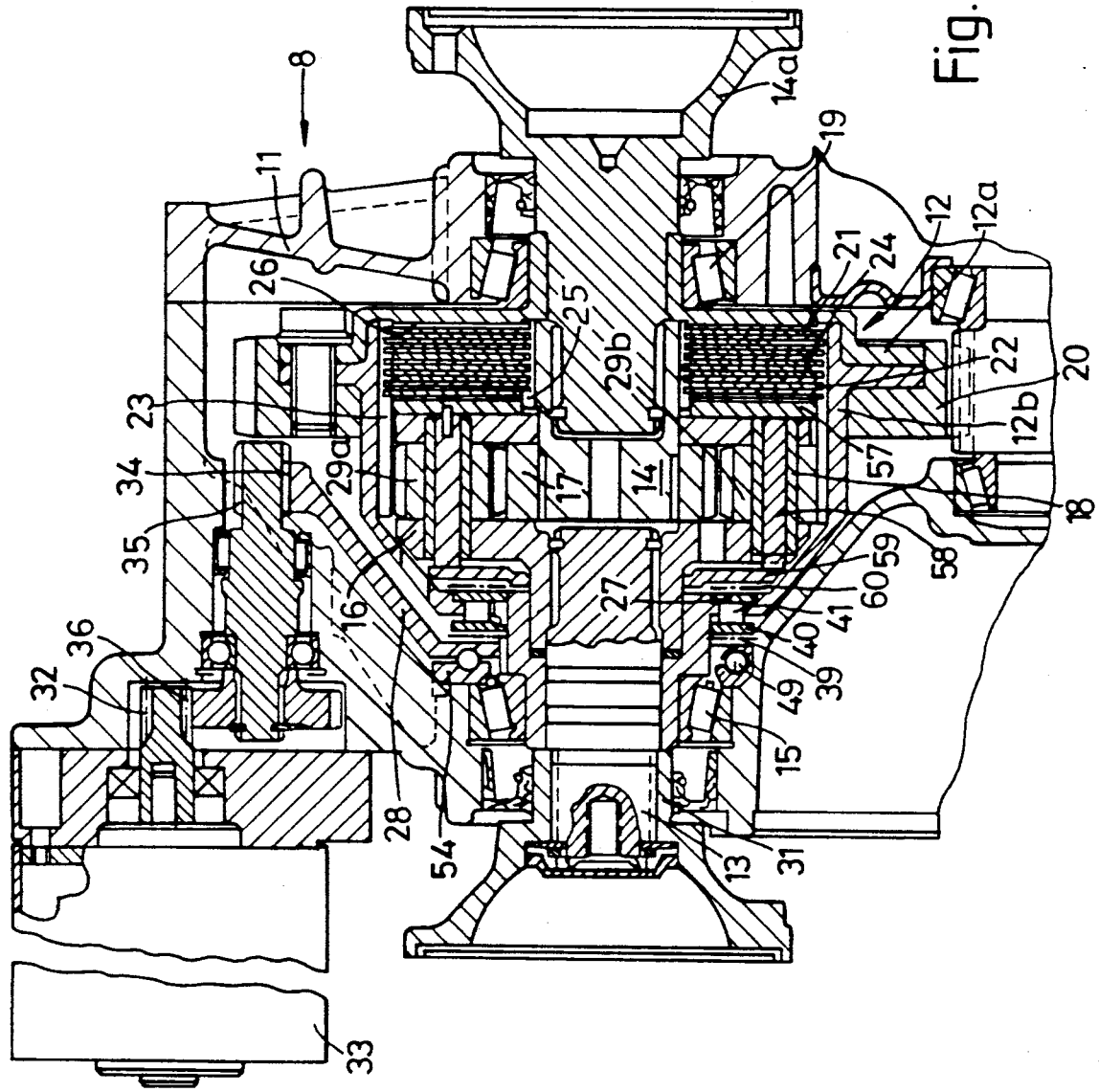
FIG. 2 is a part section through a first embodiment of differential unit according to the invention for use in the vehicle driveline shown in FIG. 1.
Figure 3:
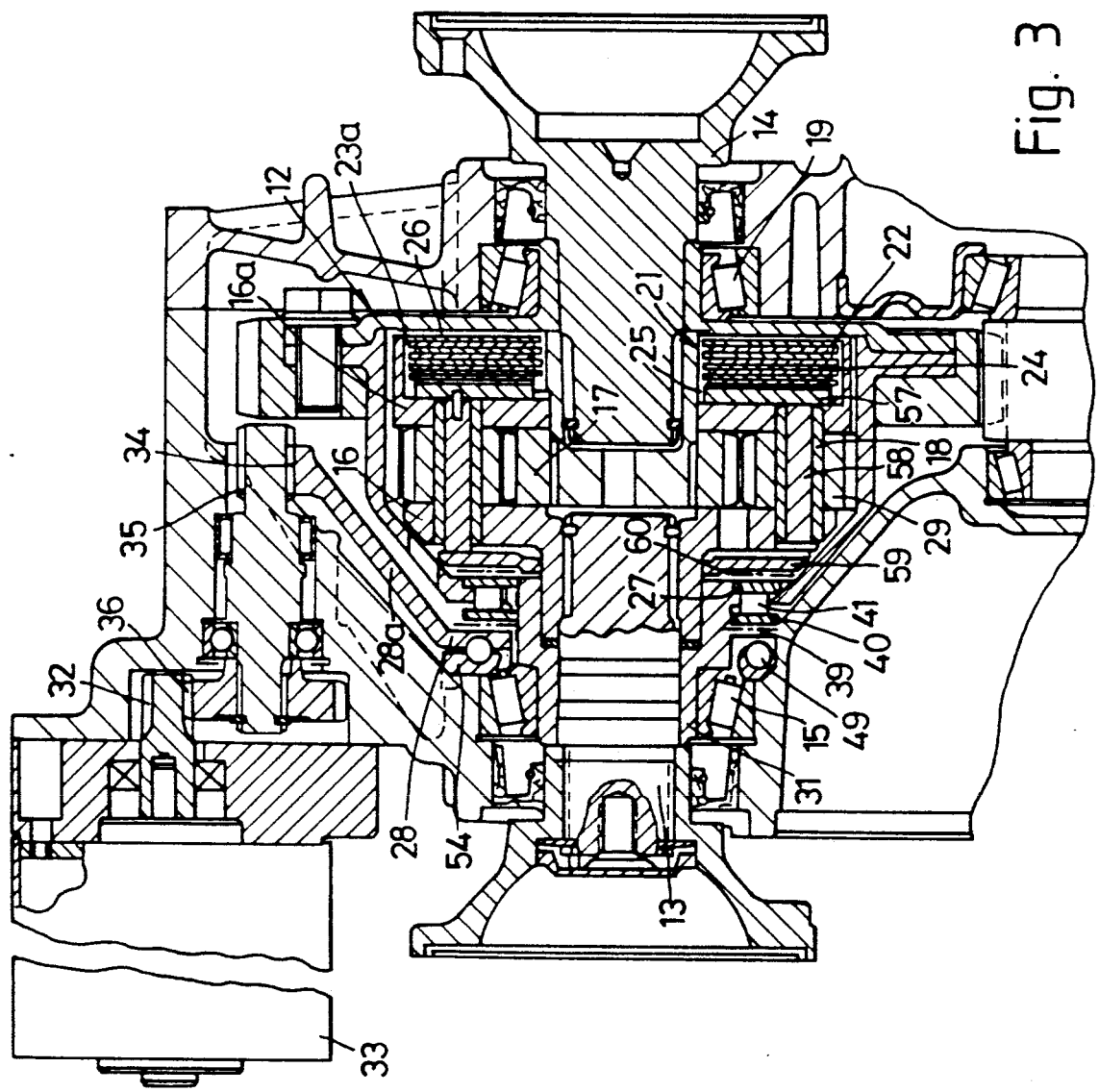
FIG. 3 is a part section through a further embodiment of differential unit according to the invention, for use in the drive line of FIG. 1.
Figure 5:
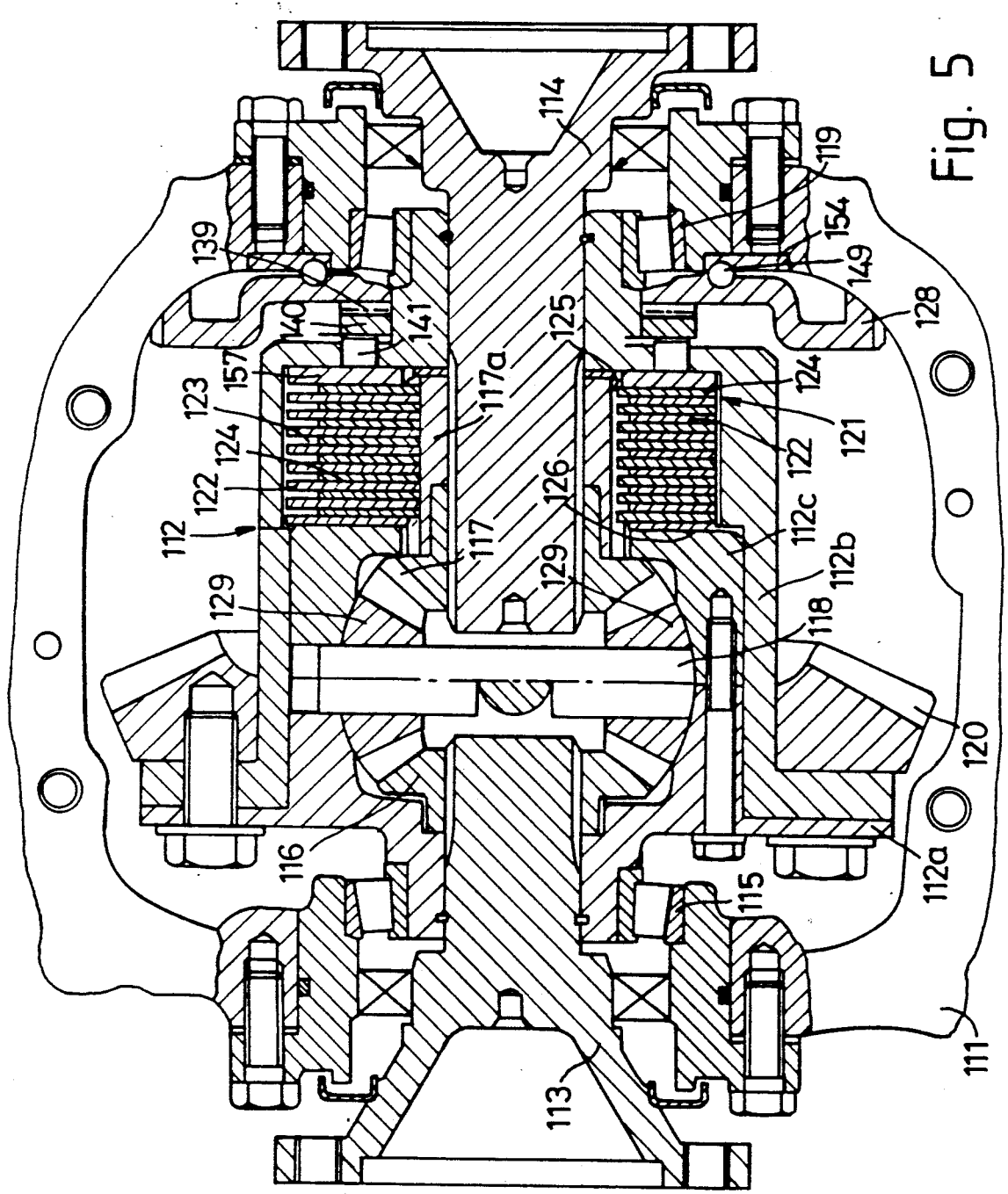
FIG. 5 is a part section through a further embodiment of differential unit according to the invention, for use in the driveline shown in FIG. 4.
Figure 6:
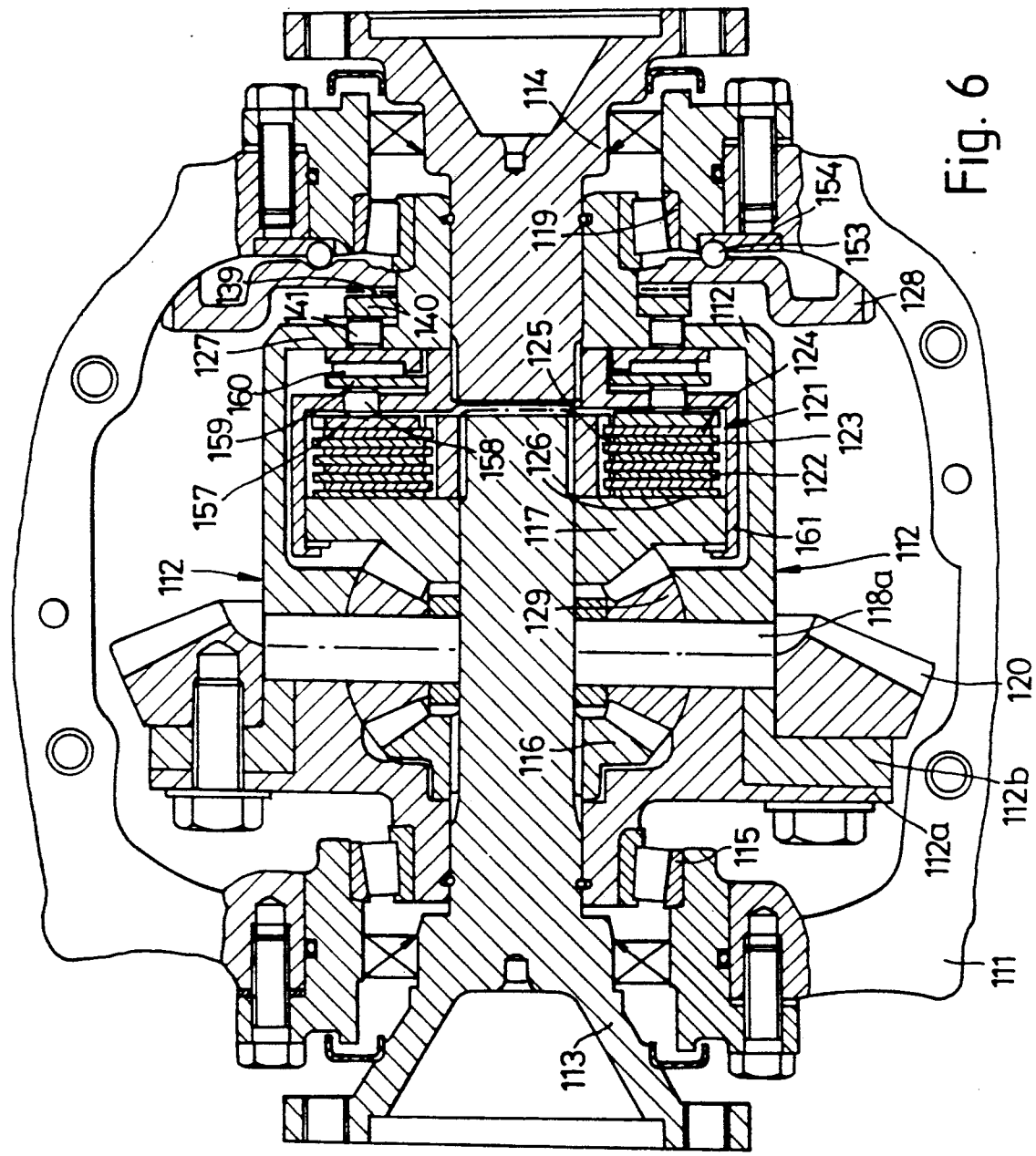
FIG. 6 is a part section through yet a further embodiment of differential unit according to the invention, for use in the driveline of FIG. 4.

Differential units which may be used in the vehicle shown in FIG. 1 are illustrated in FIGS. 2 and 3. These show differential units in which the necessary differential action is obtained by planetary gearing arrangements. FIGS. 5 and 6 show differential units in which the differential action is obtained by the use of gearing of bevel gear type, and although the differential units of FIGS. 5 and 6 are designed so as to be suitable for a rear wheel drive vehicle as described hereafter, it will be appreciated that with suitable modification these differential units may alternatively be used in a front wheel drive vehicle.

Referring now to FIG. 2 of the drawings, the differential unit there shown comprises a housing 11 within which is rotatably supported, by taper roller bearings 15, 19, a differential carrier 12. The differential carrier 12 is of divided construction, its two parts being joined at a flange to which is secured a driving gear 20 by which the differential carrier is driven from the gearbox of the vehicle. The gearbox is provided with a suitable gear shown in outline in FIG. 2 meshing with the driving gear 20.

The differential carrier 12 supports, for rotation relative to the carrier about the axis on which the carrier itself is rotatable, two output elements in the form of a planet carrier 16 and a sun gear 17, of which the former has a splined torque transmitting connection to a first output shaft 13 provided with a drive flange 31, and the latter is received on a second output stub shaft 14 connected to the spigot of a drive flange element 14a. The drive flanges serve to connect the outputs of the differential to the driveshafts 9, 10.

As above referred to, the differential carrier 12 is in two parts which are indicated at 12a, 12b. The part 12b is internally toothed at 23. The planet carrier 16 carries six circumferentially spaced hollow journals 18 on which are rotatably received planet gears. The planet gears are arranged in pairs, each pair comprising a gear 29a meshing with the sun gear 17 and a gear 29b meshing with the internal teeth 23 of the differential carrier part 12b, the gears 29a and 29b of each pair meshing with one another. The section in which FIG. 2 is taken shows one of the gears 29a and one of the gears 29b. Thus a driving connection is provided from the drive gear 20 to the output elements of the differential unit, with the necessary ability being provided for differential rotation between the output elements.

The differential unit incorporates a friction assembly 21 comprising a number of plates 22 interleaved with plates 24. The plates 22 have teeth on their external periphery, engaging extensions of the internal teeth 23 in the carrier part 12b with which the planet gears 29b engage. The plates 24, each being disposed between two plates 22, have their internal circumference provided with teeth engaged with complementary teeth 25 provided on the exterior of a sleeve-like extension of the output stub shaft element 14. The plates 22, 24 are abe to move axially on their respective teeth so that when an axial force is applied to the assembly of plates a braking action is obtained between the output element and the differential carrier. If required freely rotatable intermediate plates may be disposed between adjacent plates 22, 24.

An axially endmost one of the plates 22, 24 forming the friction assembly 21 abuts a supporting face 26 on the part 12a of the differential carrier 12. At the opposite end of the friction assembly, one of the plates is engageable by a pressure plate 57. Tappets 58 pass through the hollow planet gear-supporting journals 18, and engage the pressure plate 57. At their other ends, the tappets are contacted by a thrust plate 59. A further thrust plate 27 is operable on the thrust plate 59 with the intermediary of a thrust bearing 60. The thrust plate 27 is operable upon by yet a further thrust plate 40 by way of tappets 41 which extend through apertures in the carrier part 12b, and these tappets 41 may provide for adjustment of the distance between the thrust plates 27, 40. The thrust plate 40 is in turn operable on by a rotatable actuating ring 28 with the interposition of yet a further thrust bearing 39, to reduce frictional effects to a minimum. It will be appreciated that the thrust plate 40 rotates with the differential carrier 12, whilst the actuating ring 28 is only angularly movable through substantially less than half a revolution, as described hereafter.

An abutment ring 54 lies against an internal surface of the housing 11 adjacent the bearing 15. The abutment ring is provided with cam surfaces in the form of a number of spaced circumferentially extending grooves or indentations which face complementary such grooves or indentations in the actuating ring 28, and a plurality of balls 49 are disposed one in each facing pair of such grooves or indentations. The grooves have an axial depth which varies as they extend circumferentially so that angular movement of the actuating ring produces an axial movement thereof. The precise configuration of the grooves according to the present invention will be described in greater detail hereafter.

The actuating ring 28 has an extension 28a which extends radially and axially and ends in an arcuate portion with external teeth 34 which may be helical. These are engaged by a pinion 35 provided on the end of a shaft rotatably supported in the housing 11, the other end of the shaft being drivable by an electric motor 33 through a reduction gearing 32, 36. Thus operation of the electric motor 33 produces the angular movement of the actuating ring 28, to produce axial movement of the latter and hence, through the various thrust rings and tappets above described, movement of the pressure plate 57 to bring the plates 22, 24 into frictional engagement with one another to inhibit or completely lock, depending on the pressure applied, the differential action of the differential unit.

Referring now to FIG. 3 of the drawings, this shows a differential unit of which certain parts are identical to those shown in FIG. 2, and which are therefore accorded the same reference numerals. It differs from the unit shown in FIG. 2 only in respect of the rotatable element of the differential which is engaged by the plates 22. The plates 22, which have teeth 23a provided in a sleeve extension of a member 16a which receives the ends of the hollow journals 18 opposite to the ends thereof held by the planet carrier 16. Since the planet carrier 16 forms one of the output elements of the differential, the friction assembly of plates 22, 24 thus provides its braking effect directly between the output elements of the differential unit rather than between one of the output elements and the input element (the differential carrier) thereof. Because of such direct application of the braking effect of the friction assembly to inhibit or lock the differential action of the unit, a lower braking torque needs to be exerted by the friction assembly in the FIG. 3 embodiment as compared with the FIG. 2 embodiment, and hence fewer plates 22, 24 need to be provided.

Figure 4:
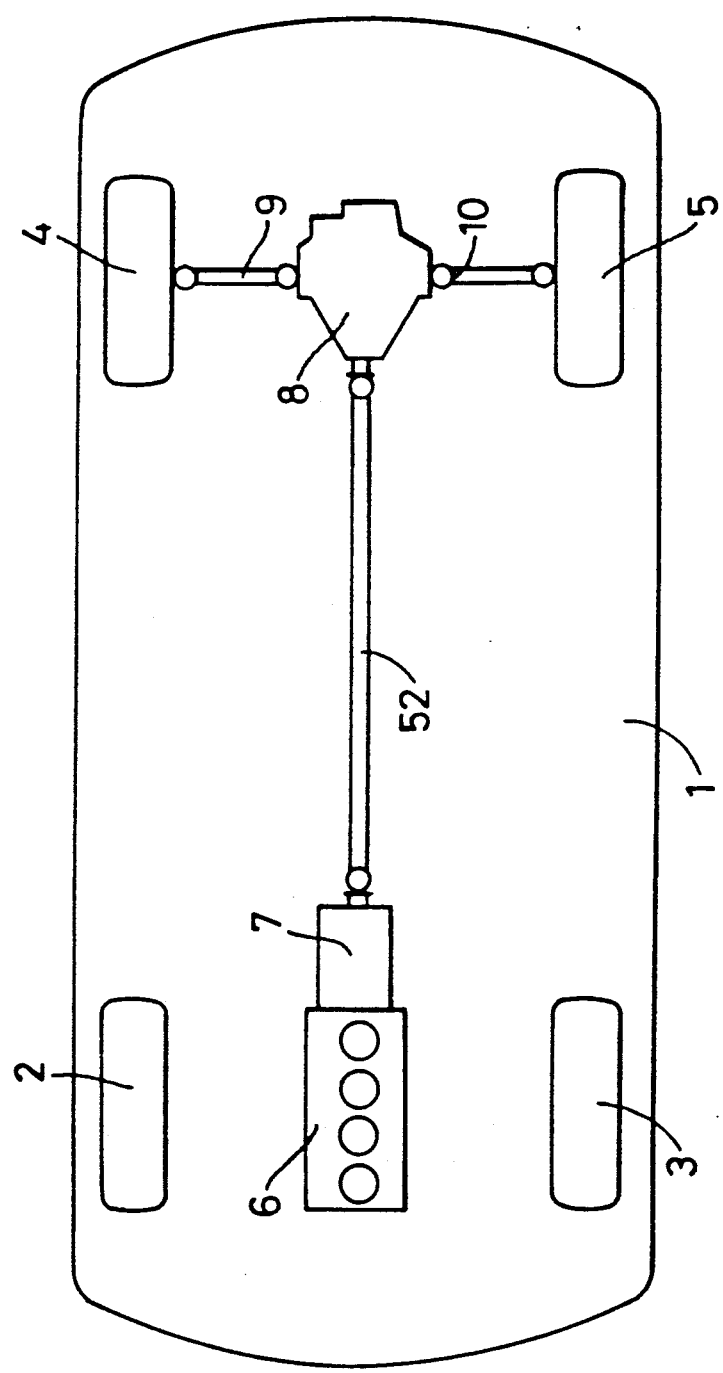
FIG. 4 shows diagrammatically the driveline arrangement of a rear wheel drive vehicle.

Referring now to FIG. 4 of the drawings, this shows in diagrammatic plan view a rear wheel drive motor vehicle. As in the embodiment of FIG. 1, it has front wheels 2, 3; rear wheels 4, 5; an engine 6; gearbox 7; a differential unit 8, and driveshafts 9, 10. In this case, however, there is a propeller shaft 52 leading from the gearbox 7 to the differential unit 8 which is of course rear mounted to drive the rear wheels.

FIGS. 5 and 6 show different embodiments of bevel gear type differential units suitable for use in the rear wheel drive vehicle.

The differential unit shown in FIG. 5 comprises a housing 111 within which there is rotatably supported, by bearings 115, 119, a differential carrier 112. The differential carrier 112 has a flange to which is bolted a crown wheel 120 to be engaged by a driving pinion (not shown) rotatable about an axis perpendicular to the axis of rotation of the carrier 112.

The carrier 112 comprises three components 112a, 112b, and 112c. The component 112b is generally cup-shaped, whilst the component 112a secured to the component 112b (by the bolts which hold the crown wheel 120) closes the open end of the component 112b. Component 112c fits within the component 112b being secured to the closure part 112a by further bolts. The parts 112a, 112c support two transversely extending pins at right-angles to one another, one of which is indicated at 118. The pins support bevel differential gears 129, which mesh with side gears 116, 117 which form the output elements of the differential unit. The side gears 116, 117 are connected to output shafts 113, 114 provided with drive flanges for connection to the driveshafts 9, 10.

A friction assembly 121 is disposed in the differential carrier, comprising interleaved friction plates 122, 124 of which the plates 122 are rotationally fast with the carrier part 112b having toothed engagement therewith at the outer periphery of the plates, whilst the plates 124 are rotationally fast with the output element 117 and output shaft 114, having toothed engagement at the inner periphery of the plates with a sleeve 117a splined to the output shaft 114. An end one of the plates 122 abuts a surface 126 on the carrier part 112c, whilst the opposite end one of the plates 124 abuts a pressure plate 157. Tappets 141 extend through the carrier part 112b to abut a thrust ring 140 which is operable upon by an actuating ring 128 with the intermediary of a thrust bearing 139. The actuating ring 128 carries external teeth to move the actuating ring angularly by an electric motor and reduction gear, not shown but generally as above described in relation to FIGS. 2 and 3. Axial movement of the actuating ring 128 upon angular movement thereof is provided by an abutment ring 154 facing the actuating ring, these rings having oppositely inclined grooves therein and balls 149 received therein all as above described.

The differential unit shown in FIG. 6 is generally the same as that shown in FIG. 5, with the same reference numerals used for corresponding parts. The difference is that in the embodiment of FIG. 6 the output shaft 113 is of sufficient length to extend through the side gear 117 and engage a sleeve 117a with which the plates 124 are rotationally fast. The plates 122 are rotationally fast with an external sleeve 161 fitting on the outside of side gear 117, which sleeve 161 serves for torque transmission to the output shaft 114 which is shorter than the corresponding shaft in the embodiment of FIG. 5. The differential carrier 112 is of different construction from the FIG. 5 embodiment, comprising only two parts 112a, 112b, and the bevel differential gears 129 are supported on short individual pins 118a.

In the embodiment of FIG. 6, there is an abutment ring 154 and actuating ring 128, with balls 153 engaging opposed circumferentially extending recesses of variable axial depth therein, as in the embodiment of FIG. 5. The axial movement of the actuating ring 128 is, however, transmitted to a pressure plate 157 engaging the plates 122, 124, through the intermediary of tappets 158, thrust ring 159, thrust bearing 160, further tappets 141 which extend through the carrier part 12b, and a further thrust ring 140 and thrust bearing 139.

FIGS. 7 to 10 of the drawings show diagrammatically and in greater detail the construction and mode of operation of the actuating ring and abutment ring, cam surfaces therebetween, and associated components, applicable to all the embodiments described above.

Figure 7:
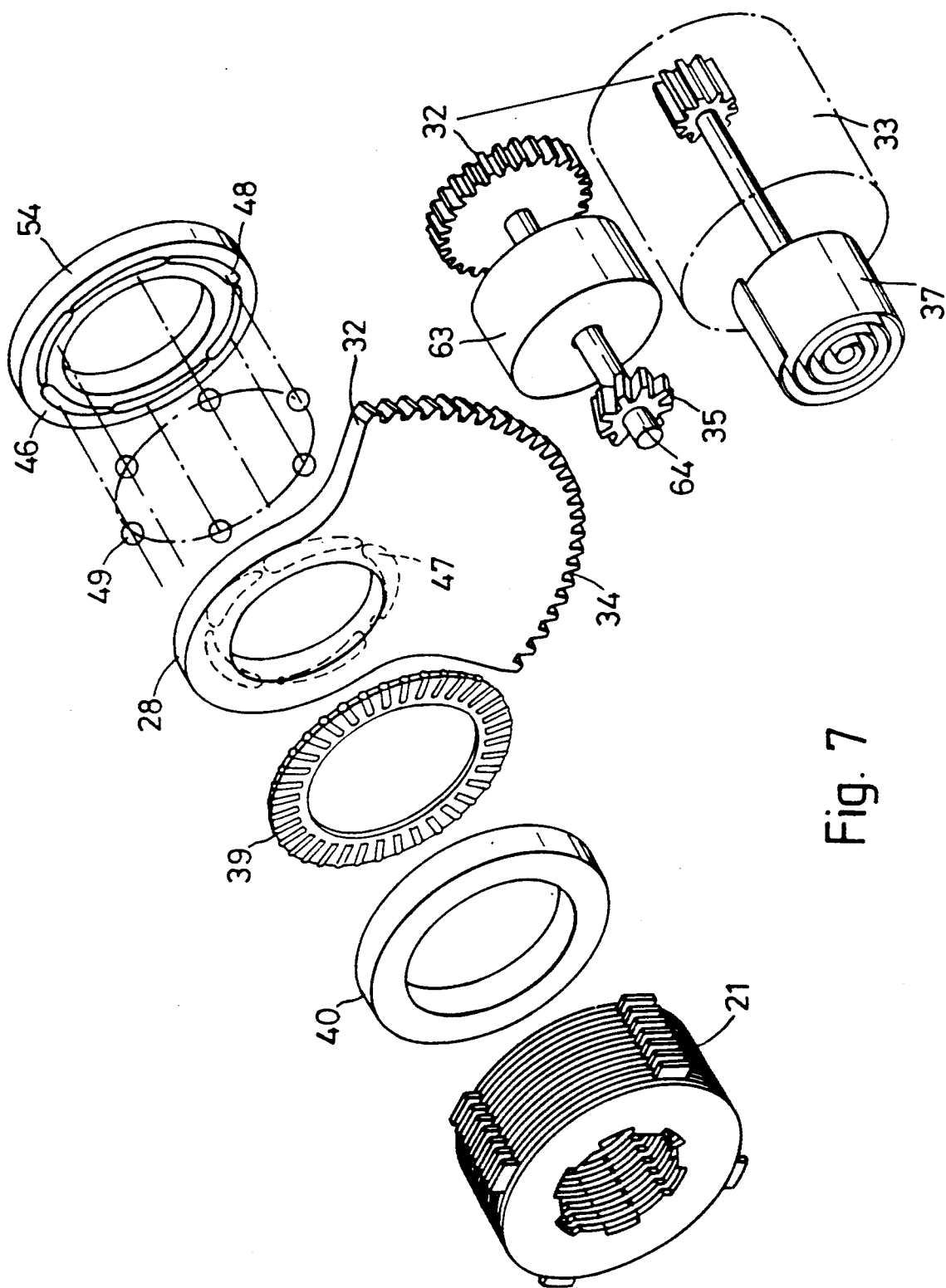
FIG. 7 is an exploded perspective view of an actuating mechanism for a differential unit according to the invention.

FIG. 7 shows the actuating ring 28 with a lateral extension having a part-circular peripheral portion provided with gear teeth 34. These teeth mesh with a pinion 35 provided on an intermediate shaft 64, which is itself connected by gearing to the shaft of an electric motor 33. The teeth 34 and of the pinion 35 are helical, arranged as above described. This gearing, with its elements indicated at 32, together makes up a reduction gearing from the motor to the actuating ring. The abutment ring is shown at 54, and in its face 46 facing the actuating ring there are visible the cam surfaces constituted by circumferentially extending grooves 48 of changing axial depth, facing complementary grooves 47, whose depth changes in the opposite circumferential sense, in the actuating ring. Balls 49 are disposed one in each facing pair of grooves in the abutment ring and actuating ring. Also shown in FIG. 7 is a thrust bearing, thrust ring and assembly 21 of friction plates, although it will be appreciated that in some of the embodiments described above there are several thrust bearings and thrust rings interposed between the actuating ring and friction assembly.

Figure 8:
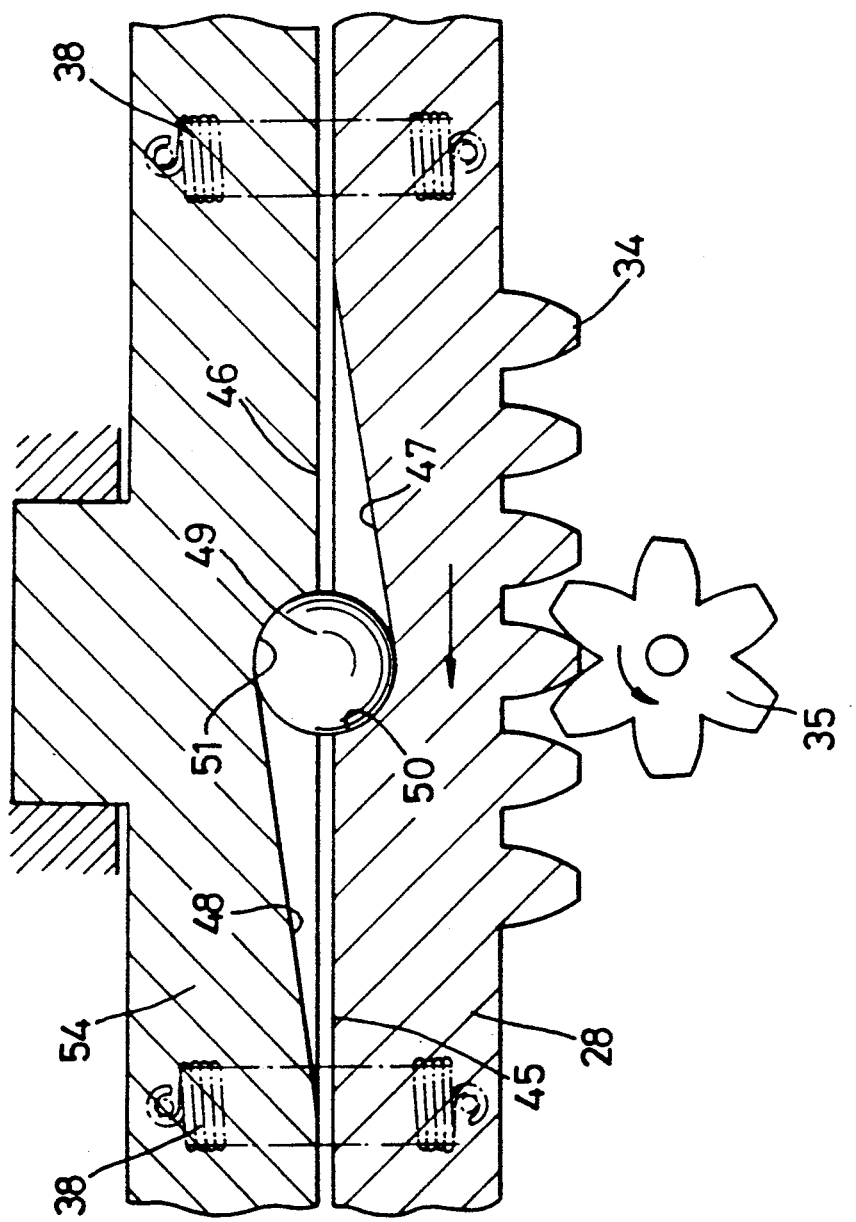
FIGS. 8 and 9 are sections through part of the mechanism of FIG. 7, in different operative conditions.

FIG. 8 shows diagrammatically one facing pair of grooves 48, 47 in the abutment ring 54 and actuating ring 28. This is a developed view of part of the circumference of the two rings. The opposite circumferential directions in which the depth of the grooves 48, 47 varies is clearly visible, and at their ends at which they are deepest the grooves provide stop faces 51, 50 which limit the angular movement of the actuating ring relative to the abutment ring in one direction. It will be appreciated that, when the actuating ring is moved angularly relative to the abutment ring, as illustrated in FIG. 9 and caused by the gear pinion 35 engaging teeth 34 on the actuating ring, the two rings are moved axially apart from one another.

Figure 9:
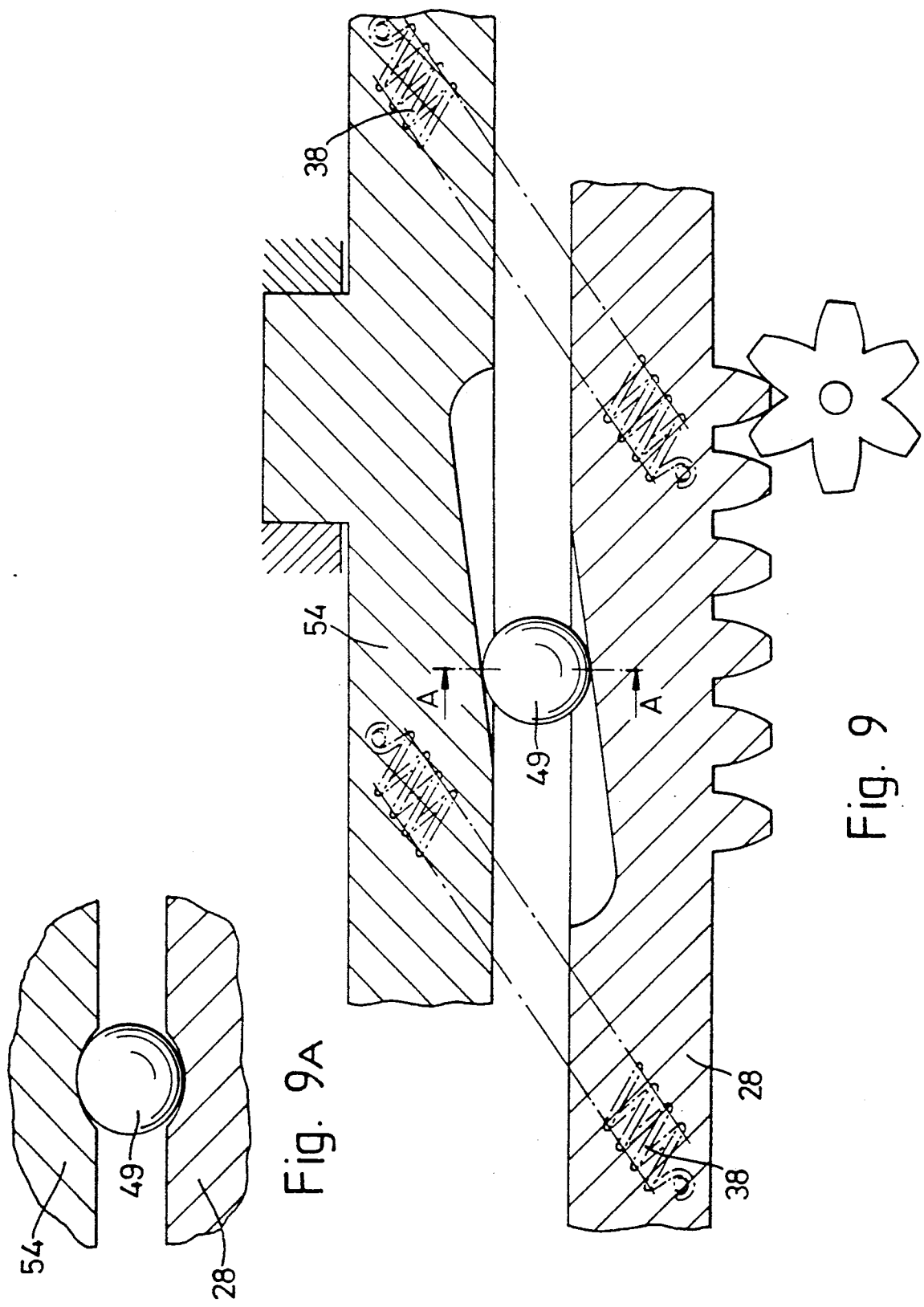

FIGS. 8 and 9 show springs 38 connected between the abutment ring 54 and actuating ring 28. These springs provide for return of the two rings to the relative position shown in FIG. 8, wherein balls 49 therebetween engage the stop faces 50, 51 at the deepest ends of the grooves.

FIG. 9a shows, in a transverse cross-section as indicated at A—A, a ball 49 engaging the grooves in the abutment ring and actuating ring.

Figure 10:
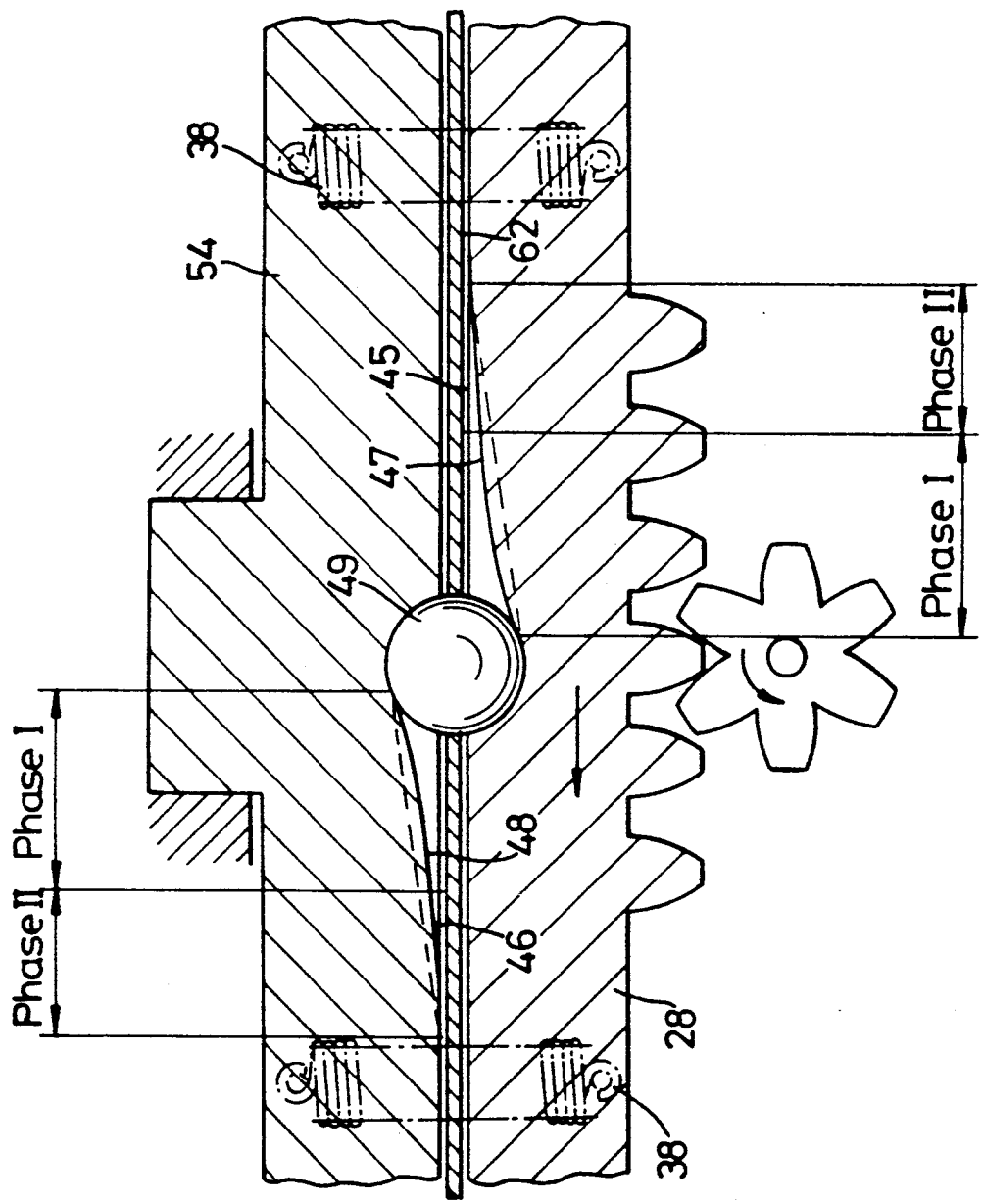
FIG. 10 is a section as FIGS. 8 and 9, illustrating a modification of the mechanism.

FIG. 10 shows, in a view corresponding to those of FIGS. 8 and 9, a modified configuration of the grooves 47, 48. The same reference numerals are used as in FIG. 8, and the FIG. 10 construction has the additional feature of a cage 62 disposed between the rings 54, 28, the balls 49 being constrained in apertures in the cage 62 so that the balls move in synchronism with one another.

The grooves 47, 48 in FIG. 10 have a pitch or inclination to the faces of their respective rings which varies along the length of the grooves. Starting from the deepest ends of the grooves, the pitch is at a maximum and then decreases over a length of the groove indicated as phase 1. Thus, during movement of the balls along the phase 1 portion of the groove, an increment of angular movement of the actuating ring relative to the abutment ring initially produces a large change of axial position of the actuating ring, but the change of axial position of the actuating ring becomes progressively smaller with further increments of angular movement thereof. Subsequently the balls reach a portion of the groove indicated as phase 2, in which the inclination of the grooves is constant so that in this phase increments of angular movement of the actuating ring produce constant but relatively small changes in the axial position thereof.

In all the above and following embodiments, the configuration of the grooves in the abutment ring and actuating ring is such that there is no tendency for self-locking or inhibition, against return movement of the actuating means to its position wherein no load is applied to the friction assembly, to occur. The return movement of the actuator ring may be assisted by the spring 38, and/or by a spiral spring 37 operative on the shaft of the motor 33. A switchable freewheeling coupling 63 may be provided in the drive gearing system connecting the electric motor to the actuating ring. The electric motor is preferably driven by a pulsating current or voltage.

Figure 11:
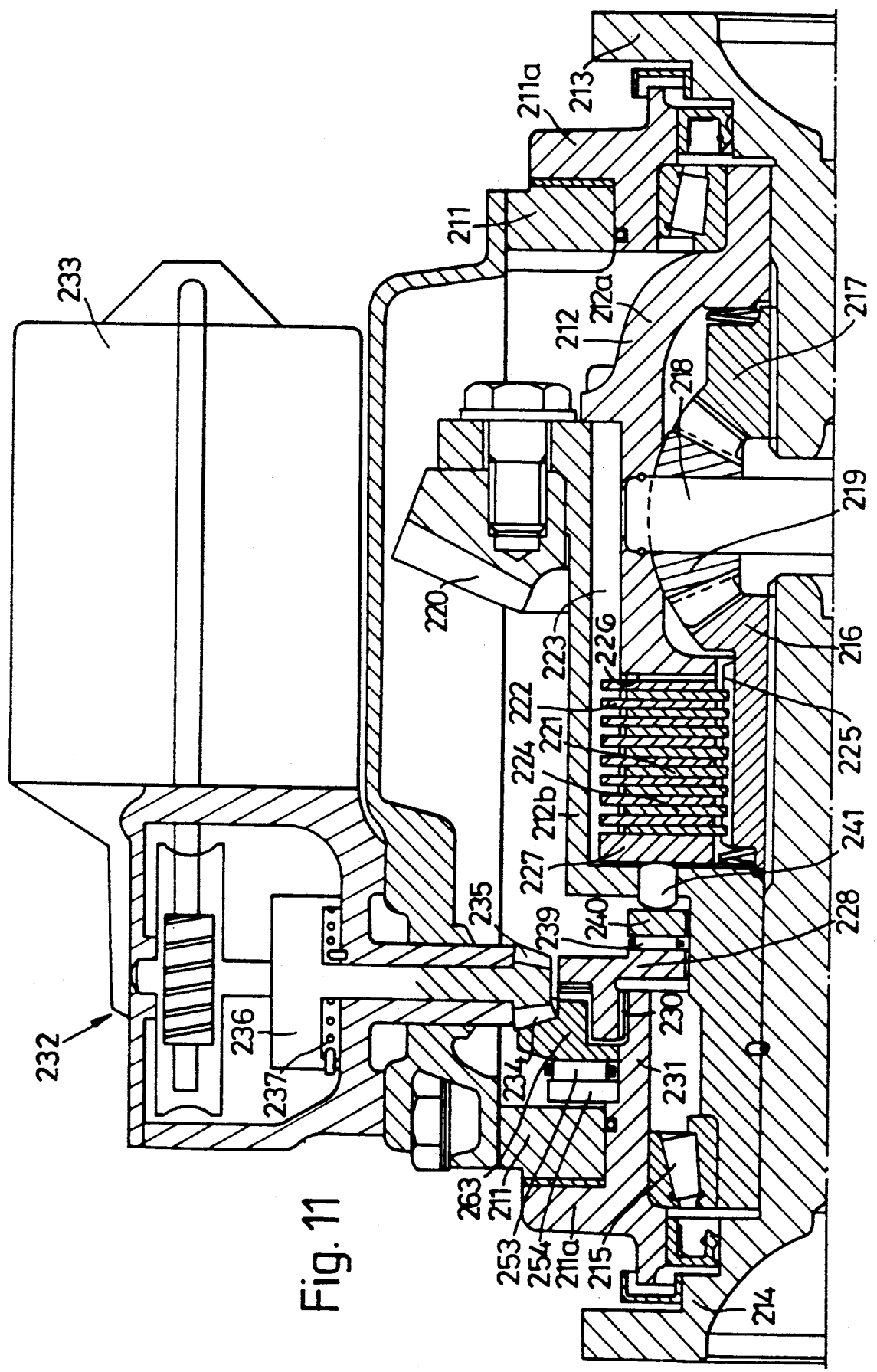
FIG. 11 is a part section through yet a further embodiment of differential unit according to the invention.

Referring now to FIG. 11 of the drawings, this shows a further embodiment of differential unit according to the invention. The differential unit comprises a housing 211, within which is rotatably supported by bearings 215 held in bearing carrier parts 211a, a differential carrier 212. The differential carrier 212 is in two main parts 212a, 212b, wherein are respectively received output bevel gears 217, 216 engaged by bevel differential gears 219. The bevel differential gears 219 are supported on a transverse pin 218 received by the differential carrier part 212a. The part 212b of the differential carrier is provided with a flange to which is bolted a crown wheel 220, to enable the differential carrier to be driven by a pinion on a shaft extending transversely to the axis of rotation of the differential carrier. The output bevel gears 216, 217 have splined bores for torque transmitting connection with output shaft elements 213, 214, which are flanged for bolting to half shafts. As an alternative, universal joints could be provided which plug directly into the output bevel gears. Of course, in the differential action of the unit, the output bevel gears can each rotate relative to the differential carrier about the axis of rotation thereof.

A friction assembly 221 comprises alternate plates 222 and 224 of which the plates 222 are rotationally fast with the carrier part 212b by way of external teeth on the plates engaging internal teeth 223 in the carrier part. The plates 224 have internal teeth by which they are held rotationally fast on external teeth 225 provided on the output bevel gear 216. The endmost one of the plates 222 is arranged to abut a supporting face 226 provided on the carrier part 212a, whilst at the opposite end of the friction assembly the endmost one of the plates 224 is engagable by a pressure plate 227 movable axially within the carrier part 212b.

Tappets 241 extend axially through the carrier part 212b, and are engaged by a thrust plate 240. A thrust bearing 239 is interposed between the thrust plate 240 and an actuating ring 228. The actuating ring 228 is non-rotatably held by inter-engaging teeth or splines 230 provided in the actuating ring and on a projection 231 of the adjacent bearing carrier 211a, which teeth or splines extend axially, so that the actuating ring is guided for axial movement. The bearing carrier projection 231 is additionally provided with an abutment ring 263 which is rotatable but does not move axially, the abutment ring 263 being supported on a thrust bearing of roller members 253 and supporting ring 254. The abutment ring and actuating ring have facing radially extending faces, provided with inclined grooves and balls received therein, in manner analogous to that above described in relation to previous embodiments of the invention.

The abutment ring 263 has part of its periphery provided with bevel gear teeth 234 engaged by a bevel pinion 235. The pinion 235 is rotatable by an electric motor 233 through worm reduction gearing 232, by way of a controllable freewheeling unit 236. A spiral return spring 237 is associated with the shaft of the bevel pinion 235, adjacent the freewheel unit 236.

The freewheeling unit 236 is operative to connect the electric motor 233, by way of the gearing 232, to the shaft of the bevel pinion 235 when operating in a sense to cause angular movement of the abutment ring in the direction which applies an axial load to the friction assembly 221. When the motor is de-energised, because the worm gearing is not a reversible gearing, the abutment ring will hold position in which it has been placed. When it is required to unload the friction assembly, the freewheel assembly would be caused to disconnect the shaft of the bevel pinion 235 from the worm gearing, enabling return of the abutment ring to the position in which no load is applied to the friction assembly. This occurs by virtue of the configuration of the grooves in the abutment ring and actuating ring, which are of the non-self-locking configuration as above described, assisted by the spiral spring 237.

If the gearing 232 were of a reversible type, the freewheeling unit could be associated directly with the shaft of the motor 233.

Figure 12:
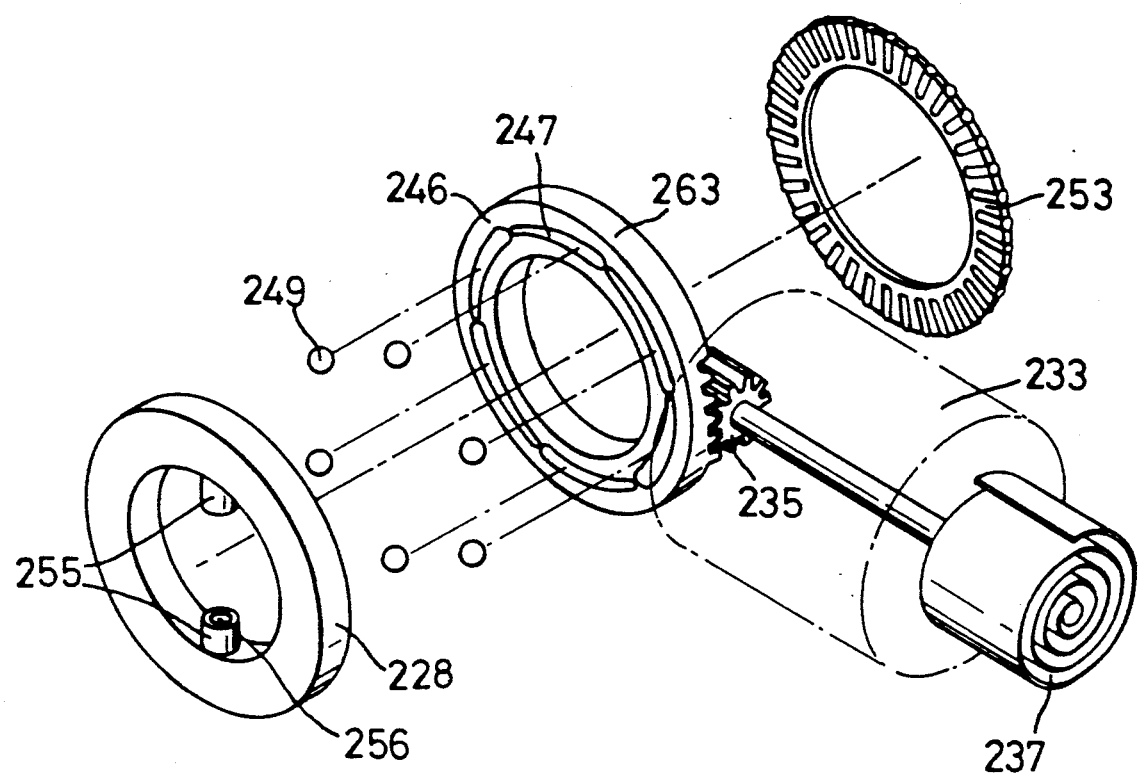
FIG. 12 is an exploded diagrammatic perspective view of part of the actuating mechanism of the differential unit of FIG. 11.

FIG. 12 shows an exploded view of a mechanism similar in concept to the actuating mechanism of that shown in FIG. 11, with certain differences. Particularly, the electric motor 233 is shown with a shaft which acts directly on the abutment ring 263, and spiral spring 237 is associated with the motor shaft. No free-wheeling coupling is shown. The disposition of a thrust bearing behind the abutment ring 263 is clearly shown, as are the grooves 247 in the face of the abutment ring, and balls 249 received therein.

Figure 13:
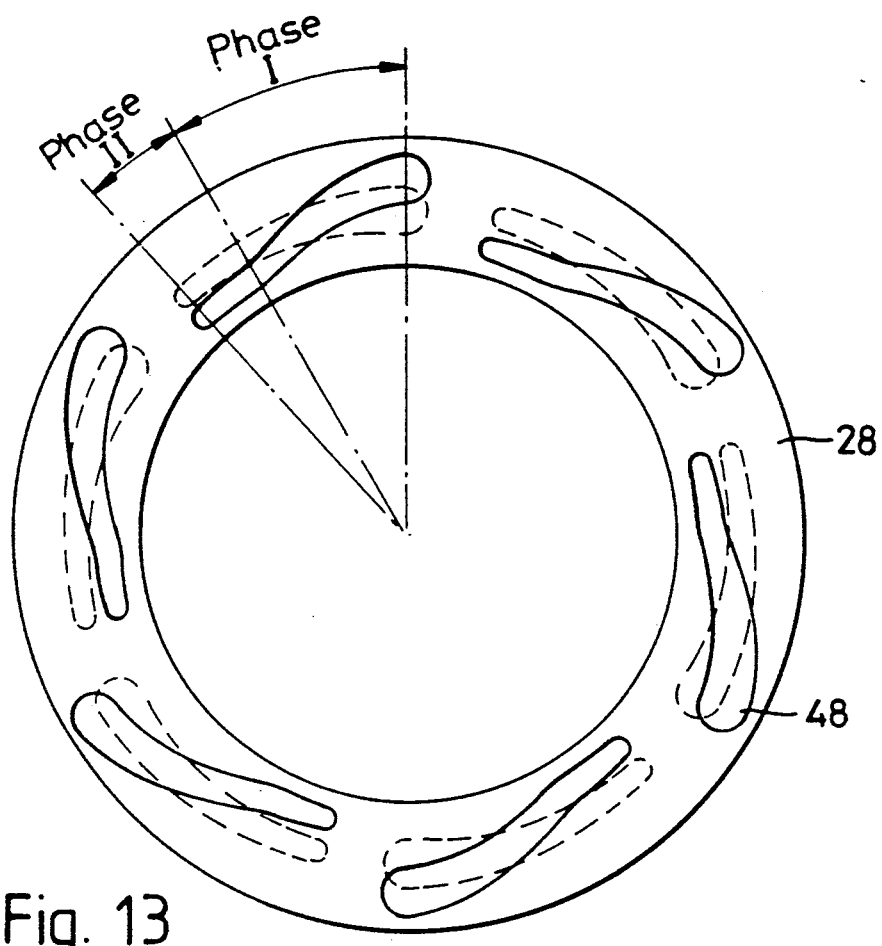
FIGS. 13 and 14 are axial views of part of the mechanism, illustrating modifications of the invention.

FIG. 13 shows an axial view of an alternative embodiment of an actuating ring 28. It has six circumferentially spaced grooves 48, which comprise portions (phase 1) which extend circumferentially and radially inwardly of the ring, and portions (phase 2) which extend solely circumferentially of the ring. If each of the grooves is of constant inclination along its length, there is obtained, by virtue of the changing radius of the grooves, a rate of change of axial position of the ring which decreases with rotation thereof in phase 1. In phase 2, the rate of change of angular position of the ring is constant. If required, it is possible to combine a change in inclination of the grooves along their length with a change in the radial disposition of the grooves to achieve a required relationships between the angular and axial positions of the actuating ring.

Figure 14:
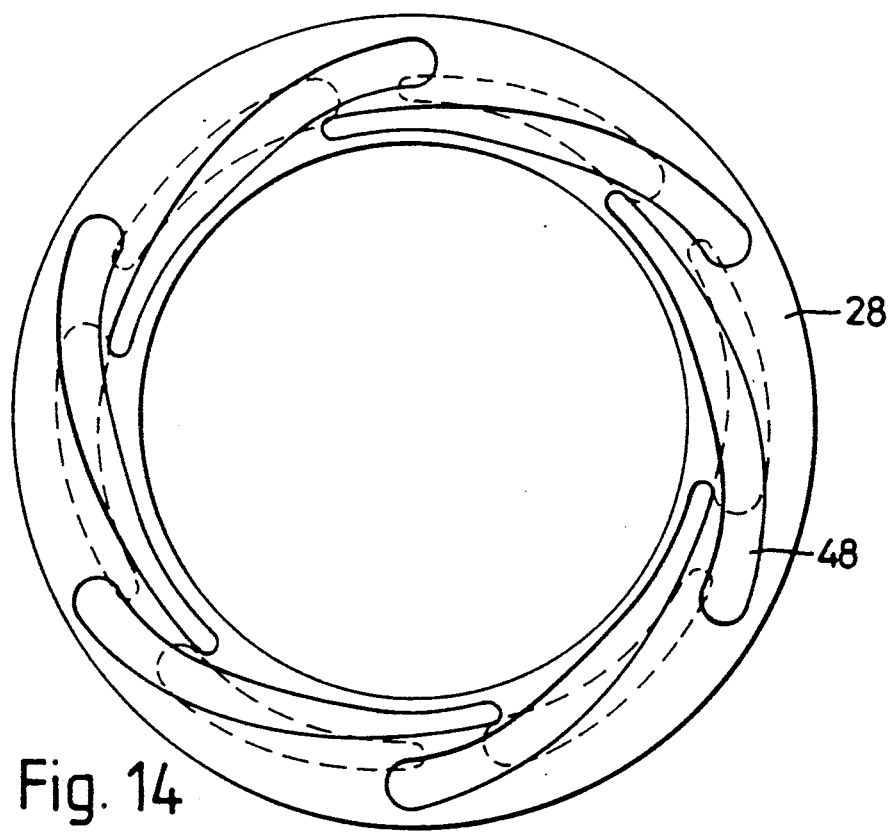

FIG. 14 is an axial view of a ring 28, wherein the grooves 40 extend radially as they extend circumferentially. Advantage has been taken of this to provide for the grooves 48 to overlap one another circumferentially, so that the grooves can be made longer and the possible angle of rotation of the ring 28 as the balls travel along the length of the grooves therein is increased. This enables a more sensitive control of the axial displacement of the adjusting ring relative to the angular movement thereof to be obtained.

I claim:

1. A differential unit comprising:
   a hosing;
   a drivable differential carrier supported in the housing for rotation about an axis;
   two output elements rotatable about said axis relative to the differential carrier and connected to respective output shafts;
   differential gears rotatable supported by the differential carrier and having driving connection with the output elements to permit differential rotation thereof;
   a friction assembly axially supported by one rotatable element of the differential, and axially loadable by an actuating means to cause a frictional restriction of said differential rotation of the output elements;
   the actuating means comprising an abutment ring axially fixed relative to the housing; an actuating ring movable axially relative thereto, one of the abutment and actuating rings being movable angularly relative to the other; and means for producing an axial movement of the actuating ring upon said relative angular movement between the rings, said means comprising cooperating surfaces provided on said abutment ring and actuating ring, and rolling members disposed therebetween;
   wherein the cooperating surfaces provided on the abutment ring and actuating ring include at least three of said surfaces per ring which are inclined to a plane at right angles to an axis of rotation of one of said rings by an angle of at least 1°, and wherein the rolling members respectively disposed therebetween are spherical, such that no self-inhibition of relative movement occurs therebetween.

2. A differential unit according to claim 1 wherein said angularly movable one of the abutment and actuating rings comprises a peripheral portion having teeth engaged by a toothed driving pinion.

3. A differential unit according to claim 2 wherein said toothed pinion is rotatable about an axis parallel to said axis of the differential carrier and output elements.

4. A differential unit according to claim 3 wherein said teeth on the ring and pinion are helical teeth.

5. A differential unit according to claim 1 comprising a motor and a reduction gearing for effecting said angular movement of said one of the abutment and actuating rings.

6. A differential unit according to claim 1 comprising means for applying a pulsating torque to the angularly movable one of said abutment and actuating rings.

7. A differential unit according to claim 5 wherein said motor is an electric motor.

8. A differential unit according to claim 7 comprising a pulsating power supply, of a frequency of at least 5 Hz, for said electric motor.

9. A differential unit according to claim 7 comprising a switchable freewheeling unit provided in the connection of the motor to the angularly movable ring, the freewheeling unit being operable to lock the motor against return movement of the actuating ring, but to disconnect the motor to permit return movement of the ring.

10. A differential unit according to claim 7 comprising spring means operable to return the abutment and actuating rings to their relative starting position wherein the friction assembly is unloaded.

11. A differential unit according to claim 1 wherein said cooperating surfaces of the abutment ring and actuating ring provide a non-linear relationship between angular movement of the angularly movable one of said rings and axial movement of the actuating ring.

12. A differential unit according to claim 11, wherein said non-linear relationship provides, from a starting position of the actuating ring wherein no load is applied to the friction assembly, a rate of change of axial position thereof, as a function of angular movement of the ring, which is initially high and then becomes lower.

13. A differential unit according to claim 7, of the planetary type comprising differential gears supported for rotation about axes parallel to said differential carrier axis, wherein the axial thrust exerted by the actuating means is transmitted at least through hollow journals of planetary wheels and into the friction assembly.

14. A differential unit comprising:
- a housing;
- a drivable differential carrier supported in the housing for rotation about an axis; p1 two output elements rotatable about said axis relative to the differential carrier and connected to respective output shafts;
- differential gears rotatably supported by the differential carrier and having driving connection with the output elements to permit differential rotation thereof;
- a friction assembly axially supported by one rotatable element of the differential, and axially loadable by an actuating means to cause a frictional restriction of said differential rotation of the output elements;
- the actuating means comprising an abutment ring axially fixed relative to the housing;
- an actuating ring movable relative thereto, one of the abutment and actuating rings being movable angularly relative to the other;
- means for producing an axial movement of the actuating ring upon said relative angular movement between the rings, said means comprising cooperating surfaces provided on said abutment ring and actuating ring, and rolling members disposed therebetween;
- wherein the cooperating surfaces provided on the abutment ring and actuating ring, and the rolling members disposed therebetween, are designed such that no self-inhibition of relative movement occurs therebetween; and
- further comprising an electric motor and a reduction gearing for effecting said angular movement of said one of the abutment and actuating rings, the differential unit being of a planetary type comprising differential gears supported for rotation about axes parallel to said differential carrier axis, the axial thrust exerted by the actuating means being transmitted at least through hollow journals of planetary wheels and into the friction assembly, the friction assembly being connected directly between the output elements of the differential unit.

* * * * *